Figure 1:
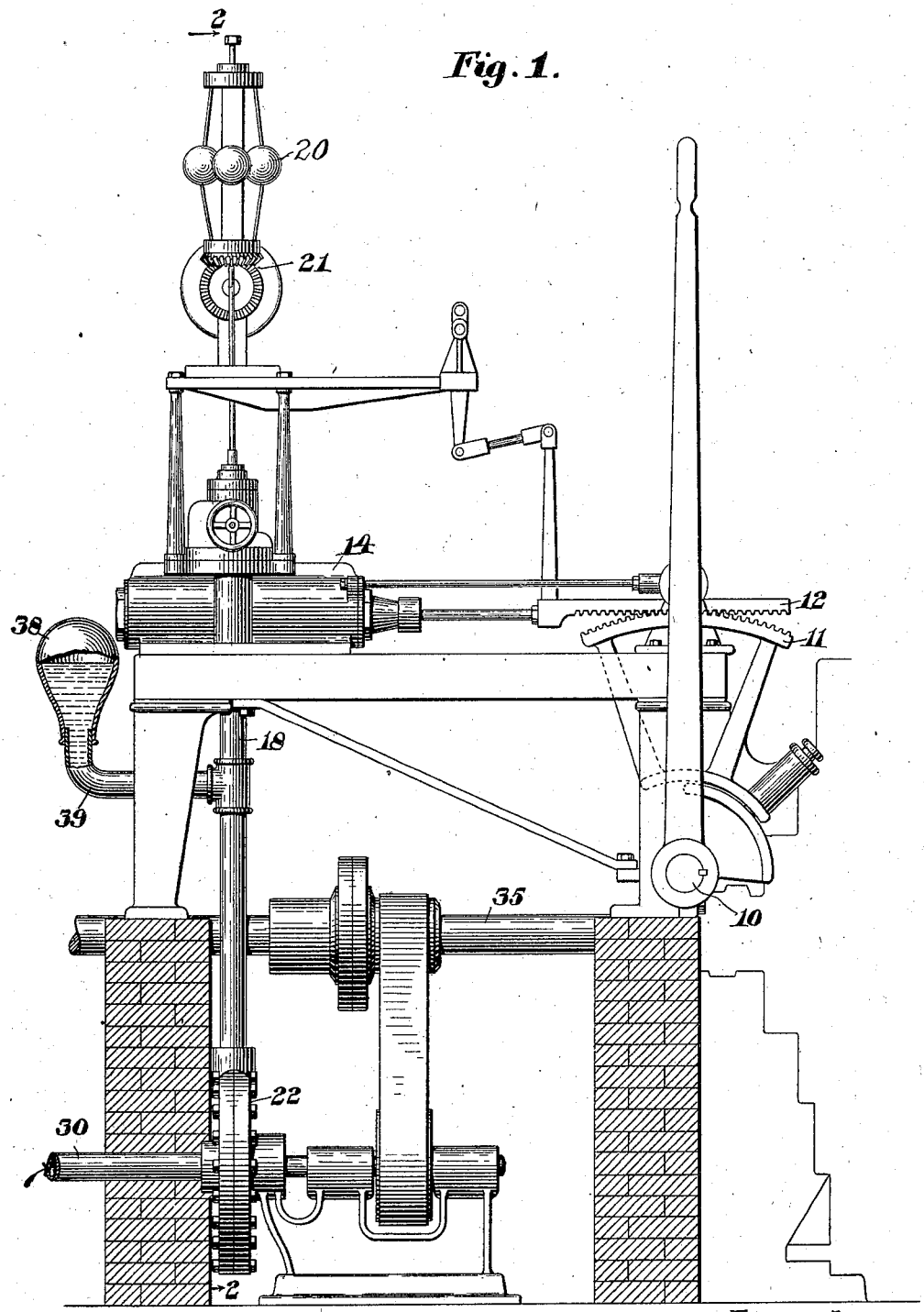

No. 727,652. PATENTED MAY 12, 1903.
N. LOMBARD.
GOVERNOR.
APPLICATION FILED MAR. 1, 1902.
NO MODEL. 3 SHEETS—SHEET 1.

Witnesses:
Nathan C. Lombard 2nd
Charles F. Logan.

Inventor:
Nathaniel Lombard,
by Lombard & Cobb,
Attys.

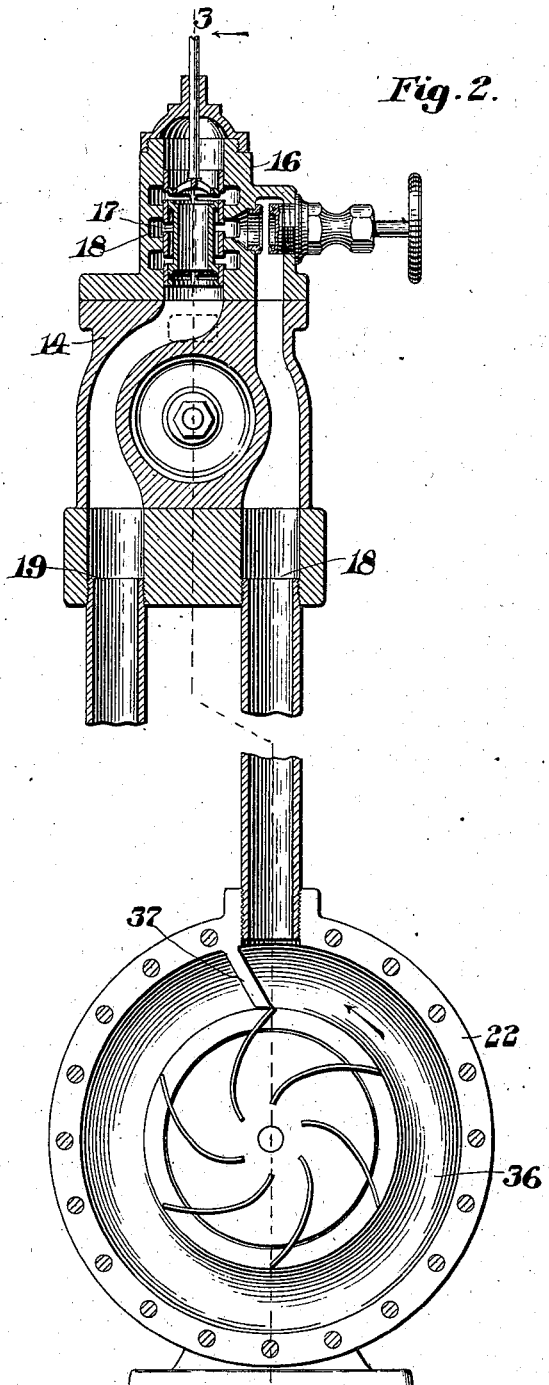

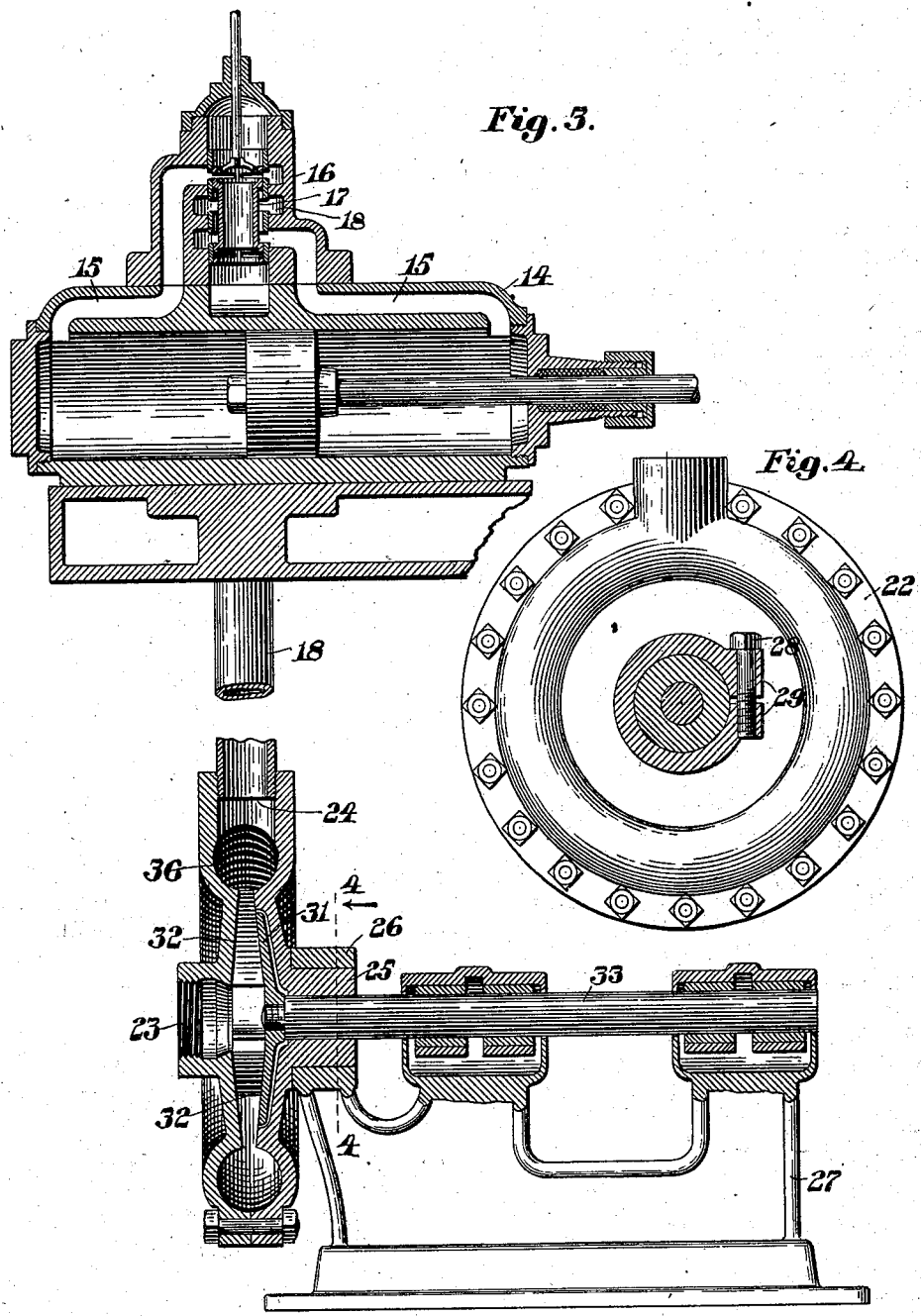

No. 727,652. Patented May 12, 1903.

UNITED STATES PATENT OFFICE.

NATHANIEL LOMBARD, OF BROOKLINE, MASSACHUSETTS, ASSIGNOR TO THE N. LOMBARD IMPROVED GOVERNOR COMPANY, OF BOSTON, MASSACHUSETTS, A CORPORATION OF MAINE.

GOVERNOR.

SPECIFICATION forming part of Letters Patent No. 727,652, dated May 12, 1903.

Application filed March 1, 1902. Serial No. 96,251. (No model.)

*To all whom it may concern:*

Be it known that I, NATHANIEL LOMBARD, a citizen of the United States of America, and a resident of Brookline, in the county of Norfolk and State of Massachusetts, have invented certain new and useful Improvements in Governors, of which the following is a specification.

My invention relates to governors, and more particularly to those used in connection with water-wheels and like apparatus.

It has for its principal object the provision of means for supplying a working pressure to the governor by a movable member which while continuously operating will have no tendency to exert more than a predetermined force.

In the accompanying drawings, Figure 1 is a side elevation of one embodiment of my invention. Fig. 2 is an enlarged broken transverse section thereof on the line 2 2 of Fig. 1. Fig. 3 is a similar partial longitudinal section on the line 3 3 of Fig. 2, and Fig. 4 is a sectional detail on the line 4 4 of Fig. 3. All sections are taken in the direction indicated by the arrows.

Similar characters indicate like parts throughout the several figures of the drawings.

The numeral 10 designates a shaft by which a gate, valve, or similar device is to be operated, this shaft being here shown as oscillated in its bearings by a segmental gear 11, secured to it, with which meshes a rack 12. This rack is reciprocated by a piston 13, operating in a power-cylinder 14, to either end of which fluid may be admitted through passages or conduits 15 15. These passages communicate through a casing 16, in which operates a valve 17, with a main supply pipe or conduit 18. Exhaust from the cylinder takes place through the passages 15 and a pipe 19. The valve is reciprocated to control admission and exhaust by revoluble weights 20, driven by suitable gearing 21 and operating in the manner usual in this class of devices, as will be clearly understood from an inspection of the drawings.

Forming a portion of the supply-conduit is a casing 22, having an inlet for the conduit at 23 at the center of one side and a peripheral outlet at 24. It is provided with a cylindrical projection 25 opposite the inlet, which is mounted to turn in a bearing 26, formed in a standard 27. The bearing is shown as slit at one side, and the parts may be drawn together to fix the casing in place by a screw 28, passing through a pair of lugs 29 on the bearing and threaded into one of them. This arrangement of support enables the casing to be turned at any angle to provide for any desired direction of the discharge-outlet. From the inlet-opening leads a pipe 30, forming a continuation of the conduit 18 and leading to any stream or body of water from which a constant supply may be drawn—as, for example, the flume or penstock of the system. Within the conduit is a rotatable pressure member comprising, in the present instance, a disk 31, provided with curved wings 32, extending from points outside the center of the disk a portion of the distance across the circumference of the casing. The disk is mounted upon the end of a shaft 33, suitably journaled in bearings in the standard 27 and rotated at the desired speed through a pulley 34, belted to some source of power, as a counter-shaft 35. Outside the pressure member an annular chamber 36 is preferably formed in the casing. An inclined directing-plate 37 may, if desired, be placed across this chamber at one side of the outlet.

At some point in the conduit between the casing and valve, preferably in close proximity to the latter, is connected a closed pressure-chamber 38 by a pipe 39. The conduit is thus constantly closed as regards intermediate lateral outlet, being without relief-valves or the like.

It will be seen that when the member within the casing is continuously rotated in the direction indicated by the arrow in Fig. 2 it will draw in fluid through the pipe 30 of the conduit and produce a pressure in the casing radially outward in all directions by the centrifugal force of the rotating fluid, this pressure being capable of adjustment to the desired point by the speed of rotation employed, causing it to rise in the conduit and exert its force therein. When the valve 17 is open for admission, this pressure becomes effective within the cylinder to move the piston in either direction and open or close the gate. When the valve is closed, the pressure remains substantially constant, the body of fluid in the casing whirring freely with the wings and in the outer peripheral chamber, offering little resistance and necessitating the expenditure of slight force in the driving. When the valve is again opened, the pressure is at once available to perform its work in the cylinder. If it is necessary to remove the casing and pressure member to a considerable distance from the governor, it may be convenient to provide the chamber 38, in which the fluid will compress the air when the governor-valve is closed, and then its force of expansion will, on account of its position, be directly available.

Having thus described my invention, I claim—

1. The combination with a power-cylinder, of a conduit for delivering a fluid thereto, a valve in the conduit for controlling the admission of fluid to the cylinder, and a continuously-rotatable member within the conduit serving to create a substantially constant pressure therein when the valve is closed and the supply of fluid cut off from the power-cylinder.

2. The combination with a power-cylinder, of a conduit for delivering a fluid thereto, a valve in the conduit for controlling the admission of fluid to the cylinder, a continuously-rotatable member within the conduit serving to create a substantially constant pressure therein when the valve is closed and the supply of fluid cut off from the power-cylinder, and a pressure-chamber communicating with the conduit in proximity to the valve.

3. The combination with a power-cylinder and a continuously-rotatable pressure member, of a conduit in which the rotatable member is contained serving to deliver a fluid under pressure to the power-cylinder, said conduit being constantly closed against lateral discharge between the power-cylinder and pressure member, and a valve in the conduit for controlling the admission of fluid to the cylinder.

4. The combination with a power-cylinder, of a conduit for delivering a fluid thereto, a valve in the conduit for controlling the admission of fluid to the cylinder, a casing forming a portion of the conduit, a rotatable pressure member in the casing, and a circumferential chamber in the casing outside of the pressure member.

5. The combination with a power-cylinder, of a conduit for delivering a fluid thereto, a valve in the conduit for controlling the admission of fluid to the cylinder, a casing provided with a peripheral opening and forming a portion of the conduit, a rotatable pressure member in the casing, and means for rotating the casing whereby the position of its peripheral opening may be varied.

Signed by me at Boston, Massachusetts, United States of America, this 24th day of February, 1902.

NATHANIEL LOMBARD.

Witnesses:
WALTER E. LOMBARD,
NATHAN C. LOMBARD, 2d.